United States Patent
Mazurenko et al.

(10) Patent No.: US 9,542,748 B2
(45) Date of Patent: Jan. 10, 2017

(54) FRONT-END ARCHITECTURE FOR IMAGE PROCESSING

(71) Applicant: LSI Corporation, San Jose, CA (US)

(72) Inventors: Ivan Leonidovich Mazurenko, Khimki (RU); Pavel Aleksandrovich Aliseitchik, Moscow (RU); Alexander Borisovich Kholodenko, Moscow (RU); Denis Vasilyevich Parfenov, Moscow (RU); Denis Vladimirovich Parkhomenko, Mytyschy (RU)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/646,656

(22) PCT Filed: Apr. 8, 2013

(86) PCT No.: PCT/RU2013/000298
§ 371 (c)(1),
(2) Date: May 21, 2015

(87) PCT Pub. No.: WO2014/168500
PCT Pub. Date: Oct. 16, 2014

(65) Prior Publication Data
US 2015/0302593 A1 Oct. 22, 2015

(51) Int. Cl.
*G06K 9/56* (2006.01)
*G06T 7/00* (2006.01)
(Continued)

(52) U.S. Cl.
CPC ............ *G06T 7/0051* (2013.01); *G06F 3/017* (2013.01); *G06K 9/00375* (2013.01); *G06K 9/46* (2013.01);
(Continued)

(58) Field of Classification Search
CPC ............ G06F 3/017; G06K 2009/4666; G06K 9/00375; G06K 9/46; G06K 9/6218; G06T 2207/10028; G06T 2207/20144; G06T 7/0051; G06T 7/0081
(Continued)

(56) References Cited

U.S. PATENT DOCUMENTS

2011/0242277 A1* 10/2011 Do .................. H04N 5/272 348/43
2012/0092359 A1* 4/2012 O'Brien-Strain ...... H04N 1/644 345/589

FOREIGN PATENT DOCUMENTS

WO 2007132451 A2 11/2007

OTHER PUBLICATIONS

PCT Search Report, International Application No. PCT/RU2013/000298, Mail Date Dec. 18, 2013, 12 pages.
(Continued)

*Primary Examiner* — Manuchehr Rahmjoo

(57) ABSTRACT

Systems and methods for image processing may perform one or more operations including, but not limited to: receiving raw image data from at least one imaging device; computing at least one image depth distance from the raw image data; computing one or more image validity flags from the raw image data; generating at least one data validity mask from the one or more image validity flags; determining a background imagery estimation from at least one image depth distance; generating at least one foreground mask from the background imagery estimation and the at least one image depth distance; generating at least one region-of-interest mask from the data validity mask and the foreground mask; and generating filtered raw image data from the raw image data and at least one region of interest mask.

20 Claims, 10 Drawing Sheets

(51) Int. Cl.
  *G06K 9/00* (2006.01)
  *G06F 3/01* (2006.01)
  *G06K 9/46* (2006.01)
  *G06K 9/62* (2006.01)
(52) U.S. Cl.
  CPC ........... *G06K 9/6218* (2013.01); *G06T 7/0081* (2013.01); *G06K 2009/4666* (2013.01); *G06T 2207/10028* (2013.01); *G06T 2207/20144* (2013.01)
(58) Field of Classification Search
  USPC ........................................................ 382/195
  See application file for complete search history.

(56) References Cited

OTHER PUBLICATIONS

Yong-Wan Lim, Hyuk-Zae Lee, Na-Eun Yang, and Rae-Hong Park; "3-D Reconstruction Using the Kinect Sensor and Its Application to a Visualization System"; 2012 IEEE International Conference on Systems, Man, and Cybernetics; Oct. 14-17, 2012; COEX, Seoul, Korea; pp. 3361-3366.

Uwe Hahne and Marc Alexa; "Depth Imaging by Combining Time-of-Flight and On-Demand Stereo"; R. Koch and A. Kolb (Eds.): Dyn3D 2009, LNCS 5742, pp. 70-83, 2009; copyright Springer-Berlag Berlin Heidelberg 2009.

Dr.-Ing. Thorsten Ringbeck and Dipl.-Ing. Bianca Hagebeuker; "A 3D Time of Flight Camera for Object Detection"; Optical 3-D measurement Techniues 09—Dec. 7, 2007 ETH Zurich, Plenary Session 1: Range Imaging 1; 10 pages.

Volker Aurich, et al; "Non-Linear Gaussian Filters Performing Edge Preserving Diffusion"; Proceeding Mustererkennung 1995, 17; DAGM-Symposium; Published Sep. 13, 1995 by Springer-Verlag London, UK; pp. 538-545 (8 pages). Article: http://www.acs.uni-duesseldorf.de/~aurich/nlg/nlg_dagm.ps.gz; and Bibliography: http://dl.acm.org/citation.cfm?id=754489&CFID=592509723&CFTOKEN=81180760&preflayout=tabs.

Leonard Kaufman; et al; "Clustering by Means of Medoids"; Statistical Data Analysis Based on the L1-Norm and Related Methods; edited by Yadolah Dodge, published by North-Holland, 1987, pp. 405-416 (12 pages). Article: https://wis.kuleuven.be/stat/robust/papers/publications-1987/kaufmanrousseeuw-clusteringbymedoids-1norm-1987.pdf; and Bibliography: https://books.google.com/books?id=lx7vAAAAMAAJ&q=%22Statistical+data+analysis+based+on+the+L1-Norm+and+RElated+Methods%22+Yadolah+Dodge+1987.

\* cited by examiner

| E(i,j) \ D(i,j) | -1 | 0 | 1 | 2 |
|---|---|---|---|---|
| -1 | -1 | 0 | -1 | -1 |
| 0 | 0 | 0 | 0 | 0 |
| 1 | -1 | 0 | 1 | 2 |
| 2 | -1 | 0 | 1 | 2 |

(G(i,j) indicated over the bolded inner region)

FIG. 6

FRONT-END ARCHITECTURE FOR IMAGE PROCESSING

FIELD OF THE INVENTION

The present invention is directed systems and methods for image processing.

SUMMARY

Systems and methods for image processing may perform one or more operations including, but not limited to: receiving raw image data from at least one imaging device; computing at least one image depth distance from the raw image data; computing one or more image validity flags from the raw image data; generating at least one data validity mask from the one or more image validity flags; determining a background imagery estimation from at least one image depth distance; generating at least one foreground mask from the background imagery estimation and the at least one image depth distance; generating at least one region-of-interest mask from the data validity mask and the foreground mask; and generating filtered raw image data from the raw image data and at least one region of interest mask.

BRIEF DESCRIPTION OF FIGURES

The numerous advantages of the disclosure may be better understood by those skilled in the art by referencing the accompanying figures in which:

FIG. 6 illustrates a chart summarizing region-of-interest mask values mapped to a valid data mask and a foreground mask;

DETAILED DESCRIPTION

Figure 1:
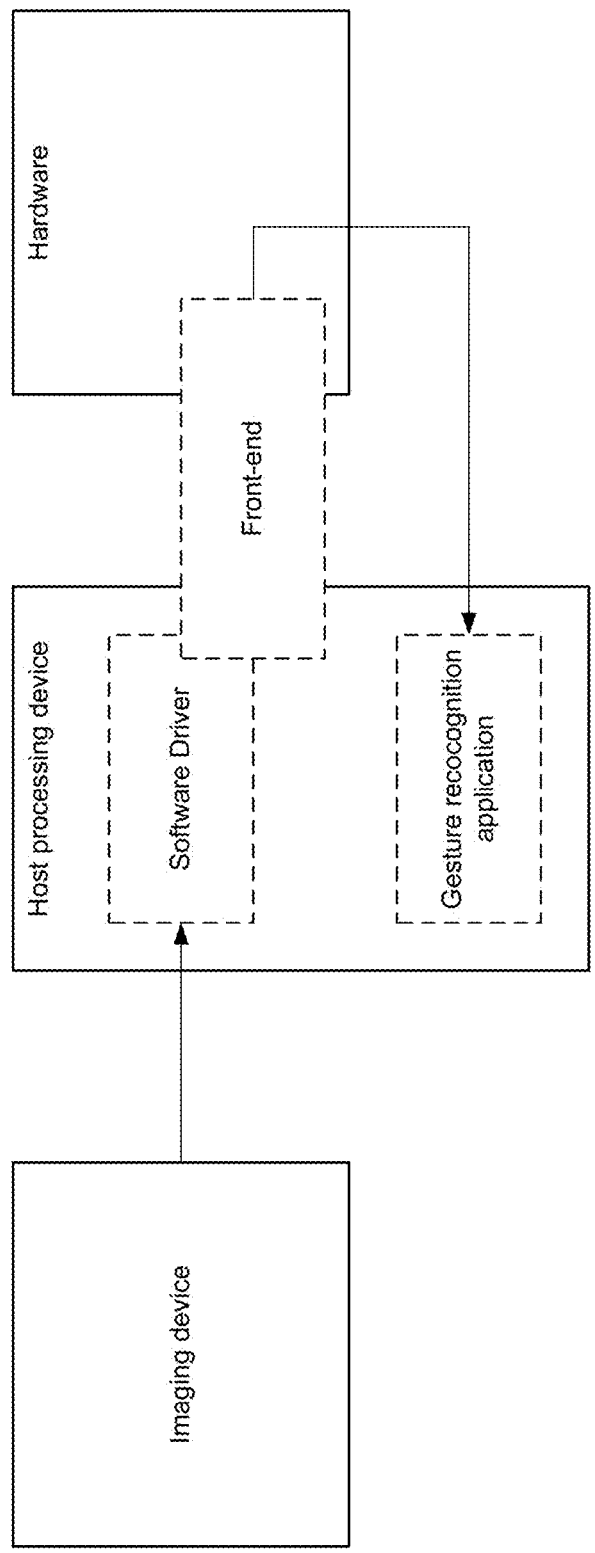
FIG. 1 illustrates an imaging system.
Figure 2:
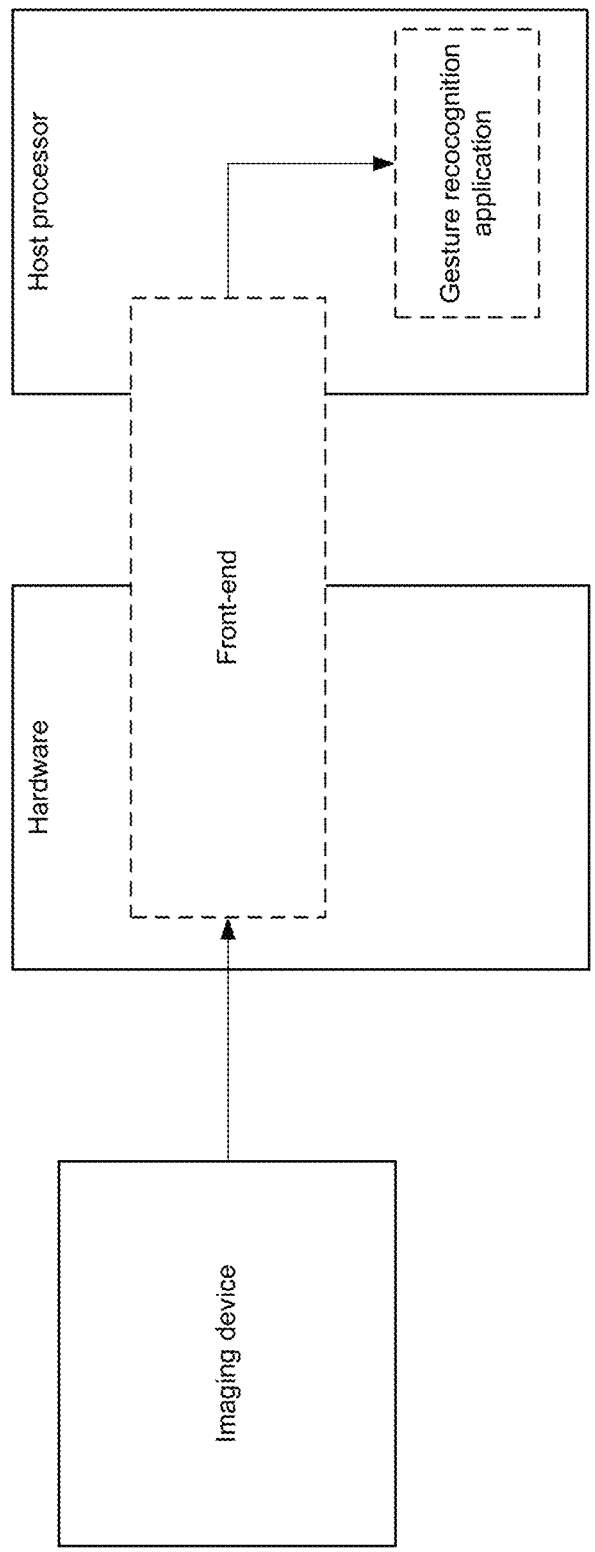
FIG. 2 illustrates an imaging system.

The present disclosures provide an effective and flexible system architecture of the gesture recognition real-time system front-end, which may use a three-dimensional (3D) data stream from a time-of-flight (ToF) camera as a source. FIGS. 1 and 2 below present exemplary embodiments of gesture recognition system configurations. The proposed approach may be applicable to both configurations, providing a high image quality at a front-end output together with the low system latency.

FIG. 1 depicts an exemplary gesture recognition system 100 including an imaging device 101, a host processing device 102 and gesture data utilization hardware 103 configured to utilize gesture data to perform one or more subsequent operations. In one embodiment, the imaging device 101 may be a ToF camera. In other embodiments, other imaging device types (e.g. structured light and/or RGB devices) may be employed without departing from the scope of the disclosure. The processing device 102 may include an imaging device software driver 104 configured to control one or more operations of the imaging device 101. Further, the processing device 102 may employ a gesture recognition application 105 to perform gesture recognition operations. The gesture recognition system 100 may further include a front-end interface 106 between the processing device 102 and the gesture data utilization hardware 103.

FIG. 2 depicts an exemplary gesture recognition system 200 including an imaging device 101, a host processing device 102 and gesture data utilization hardware 103 configured to utilize gesture data to perform one or more subsequent operations. The processing device 102 may employ a gesture recognition application 105 to perform gesture recognition operations. The gesture recognition system 200 may further include a front-end interface between the gesture data utilization hardware 103 and the processing device 102.

In an exemplary embodiment, the imaging device 101 may include a device employing time-of-flight (ToF) depth imaging.

Figure 3:
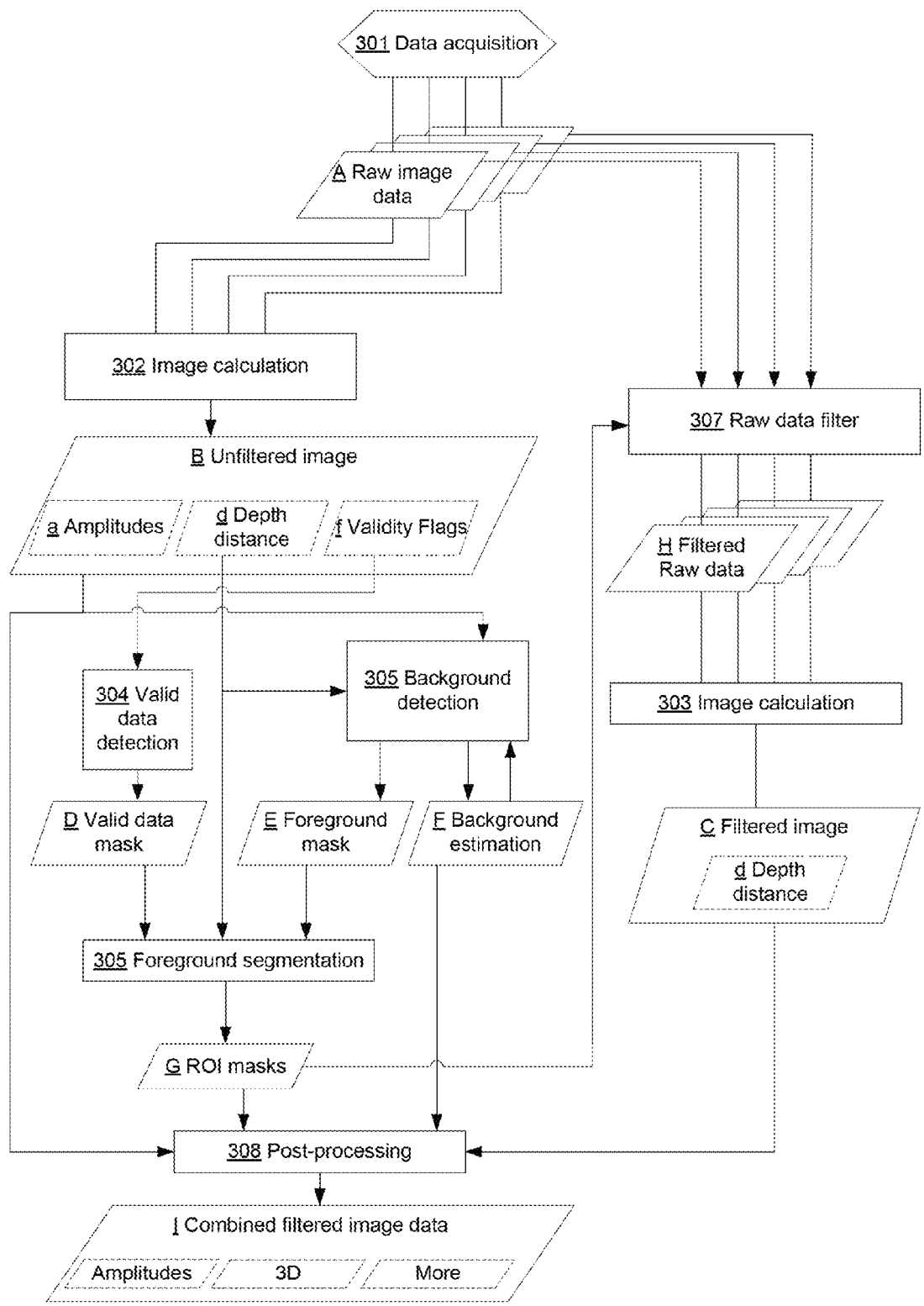
FIG. 3 illustrates an operation and data flow diagram for an imaging methodology.

An exemplary high-level diagram of process flow 300 associated with architecture for the front-end interface 106 is illustrated in FIG. 3. At a data acquisition operation 301, raw image data A may be acquired. For example, as shown in FIGS. 1 and 2, the imaging device 101 (e.g. a ToF-type sensor) may acquire the raw image data A. One or more ToF sensors of the imaging device 101 may provide raw image data A as a set of autocorrelation images A(1), A(2), ... A(n) where n is a number of such images (e.g. n=4 as in FIG. 3) and each A(i), i=1 ... n is an M×N real autocorrelation matrix where M and N are vertical and horizontal resolution of the imager. Matrixes A(i), i=1 ... n are output at operation 301.

At an image calculation operation 302 and an image calculation operation 303 the processing device 102 may receive the raw image data A and calculate and amplitude (a), a depth distance (d) as well as image validity flags (f) associated from the raw image data A. Formulas for estimating an amplitude image a and a depth distance image d from input autocorrelation images A(1), A(2), ..., A(n) of the raw image data A (e.g. where n is equal to 4) may be:

$$a = \sqrt{\frac{(A_1 - A_3)^2 + (A_2 - A_4)^2}{2}} \qquad \text{Eqn. 1}$$

$$d = \frac{c \cdot \varphi}{4\pi \cdot f_{mod}} \qquad \text{Eqn. 2}$$

where c is the speed of light constant and $f_{mod}$ is the modulation frequency of the imaging device and:

$$\varphi = \tan^{-1}\left(\frac{(A_1 - A_3)}{A_2 - A_4}\right) \qquad \text{Eqn. 3}$$

An unfiltered image B may include the amplitude image a, depth distance image d and validity flags f. The validity flags f may be M×N integer matrices where non-zero value of some bits in f(i,j) for pixel (i,j) may indicate some type of invalidity in a pixel data. For example, a comparison to one or more threshold values may indicate that a pixel attribute (e.g. amplitude) is too low, data is inconsistent, data is saturated, and the like. A set of validity flags f and their corresponding values may differ from one device to another. Some devices may not provide any sort of data validity information. The image calculation operation 302 may use threshold logic (e.g. of processing device 102) for estimating data validity.

The image calculation operation 303 may be a simplified version of image calculation operation 302 where only a depth distance image d is generated and provided as a filtered image C.

At a data validity detection operation 304 the processing device 102 may estimate an M×N data validity mask D. In one exemplary embodiment, the validity value of flags f for each pixel are correlated to the data validity mask D such that: data validity mask D(i,j) is correlated to validity flag f(i,j) where the validity flag f(i,j) is greater than 0.

Figure 4:
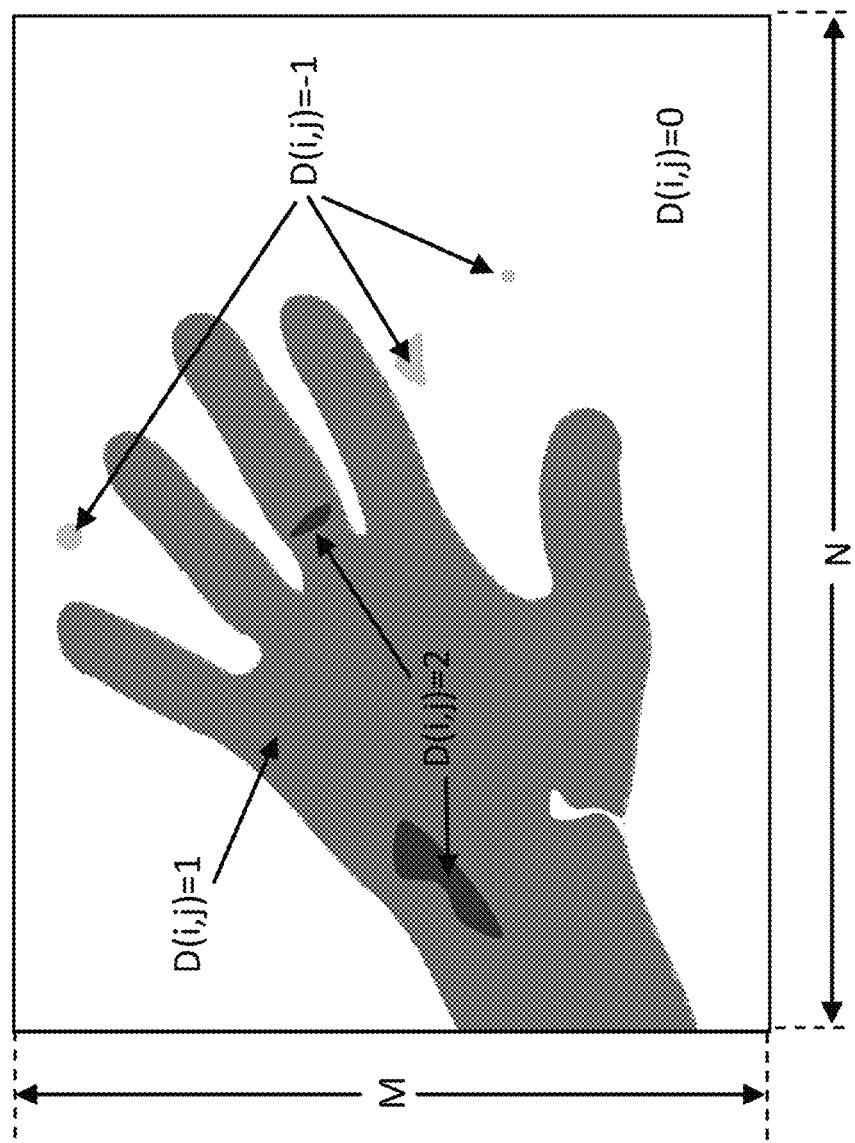
FIG. 4 illustrates an exemplary valid data mask.

In an alternate embodiment, additional data validity mask processing may be applied to the validity flags f. For example, the data validity mask D(i,j) may be initialized by correlating data validity mask D(i,j) to the validity flag f(i,j) as described above. Further, small connected sub-regions of the data validity mask D(i,j) may be removed. For example, connected sub-regions (i.e. a region (i,j) where data validity mask D(i,j)=1} may be identified and an estimated number of pixels for that region may be determined. If a given sub-region (i,j) has a size less than a given threshold value (e.g. 10 pixels), the data validity mask D(i,j) may be assigned as a first value other than 0 or 1 (e.g. −1) for each pixel of that connected sub-region. Still further, various gaps in the data validity mask D(i,j) may be filled. For example, an inverted connected sub-region of an mask (i.e. a region (i,j) where data validity mask D(i,j)=0}, may be identified and an estimated number of pixels for that region may be determined. If a given sub-region (i,j) has a size less than a given threshold value (e.g. 10 pixels), data validity mask D(i,j) may be assigned as a second value other than 0 or 1 (e.g. 2) for each pixel of that connected sub-region of the inverted mask. FIG. 4 illustrates an exemplary data validity mask D(i,j).

Referring again to FIG. 3, at a background detection operation 305, the processing device 102 may perform background imagery calculation and background extraction for each depth frame in a temporal domain. The background may be understood as a portion of an image that does not change significantly over time. Due this fact, temporal smoothing of the background to improve quality (e.g. in terms of signal-to-noise ration or mean opinion score) of the resulting depth image. It should be noted, that no significant temporal smoothing should be applied to other parts of the image, because they may contain fast moving objects and a blurred picture may be observed at the output. Referring again to FIG. 3, an unfiltered depth distance image sequence from image calculation operation 302 may be denoted as $d_1$, $d_2$, $d_3$ . . . $d_n$. The background detection operation 305 may include background imagery calculation. The proposed architecture may support different background imagery calculation methods. For example, exponential smoothing may be employed where an M×N matrix $imb_n$ denotes the background imagery of an $n^{th}$ frame so:

$$imb_n = a \cdot imb_{n-1}(i,j) + (1-a) \cdot d_n(i,j) \text{ where } 0 < i < M, 0 < j < N \quad \text{Eqn. 4}$$

where $imb_n$ corresponds to the pixel at location (i,j) in a calculated background imagery and $imb_{n-1}$ is the same pixel in the background image from a previous frame and a is a real-valued exponential smoothing coefficient (e.g. a=0.95). Based on $imb_n$ and unfiltered depth image $d_n$, a foreground mask E for concrete frame n may be extracted. For example, the foreground mask E(i,j) may be assigned according to whether $imb_n(i,j) - d_n(i,j) >$ thr where thr is a predefined threshold (e.g. thr=10). In another embodiment, an algorithm similar to the validity mask calculation described above may be employed.

A second output at background detection operation 305 may include a current background estimation F. The background estimation F may be an M×N matrix of integer values where positive values correspond to the pixels of foreground objects. Similar to the above described data validity detection operation 304 where the data validity mask D may consist of values {−1, 0, 1 and 2}, the foreground mask E may, likewise, consist of values {−1, 0, 1, 2}. Operations similar to those of the data validity detection operation 304 (e.g. mask initialization, removal of connected sub-regions, gap filling, and the like) may be applied to remove speckle noise from the foreground mask E and the inverted foreground mask E. It should be noted that for both the data validity mask D and foreground mask E, information regarding which pixels were initially assigned to the mask and its algebraic complement and which were corrected as a result of post-processing the mask are maintained. Maintaining such information may facilitate subsequent data processing operations.

The background estimation F of background detection operation 305 is an M×N matrix with estimations of background distances for all pixels. If no information is known for a given pixel such that a reasonable estimation may be made, the corresponding element of the background estimation F may be set to zero.

At a foreground segmentation operation 306, the foreground mask E, the data validity mask D and unfiltered depth distance image d may be employed to perform foreground image segmentation. The foreground segmentation operation 306 may return an unknown or predefined number of region-of-interest (ROI) masks G. The ROI masks G may represent different segments of the image. Scene segmentation may allow for effective noise filtering during subsequent operations. Each segment of an imaged scene may be de-noised independently from another in order to maintain the quality of edges between segments.

A clustering algorithm may be selected for according to desired complexity and requirements of the system. Differing clustering techniques may be employed without departing from the scope of the present descriptions. For example, implementations based on a k-medoids algorithm which may attempt to minimize a distance between points designated as part of a cluster and a point designated as the center of that cluster. A k-medoid algorithm may parse all pixels in an image and designate each of them to exactly one of a predefined number of clusters. In contrast to the a k-means algorithm, a k-medoids algorithm may choose data points as centers and works with an arbitrary matrix of distances between data points instead of a set of square-integrable functions (e.g. $L_2$). A k-medoids algorithm may be more robust to noise and outliers as compared to k-means algorithm because it minimizes a sum of pair-wise dissimilarities instead of a sum of squared Euclidean distances.

Regardless the details of the clustering technique used, the clustering algorithm and parameters may be tuned in such way that if objects in the scene: are 1) located at different distances from the camera or 2) of different color and or have distinguishable significant boundaries, then the resulting boundaries of the clusters may include the boundaries of such objects. This assumption may be true for most of typical use cases.

Figure 5:
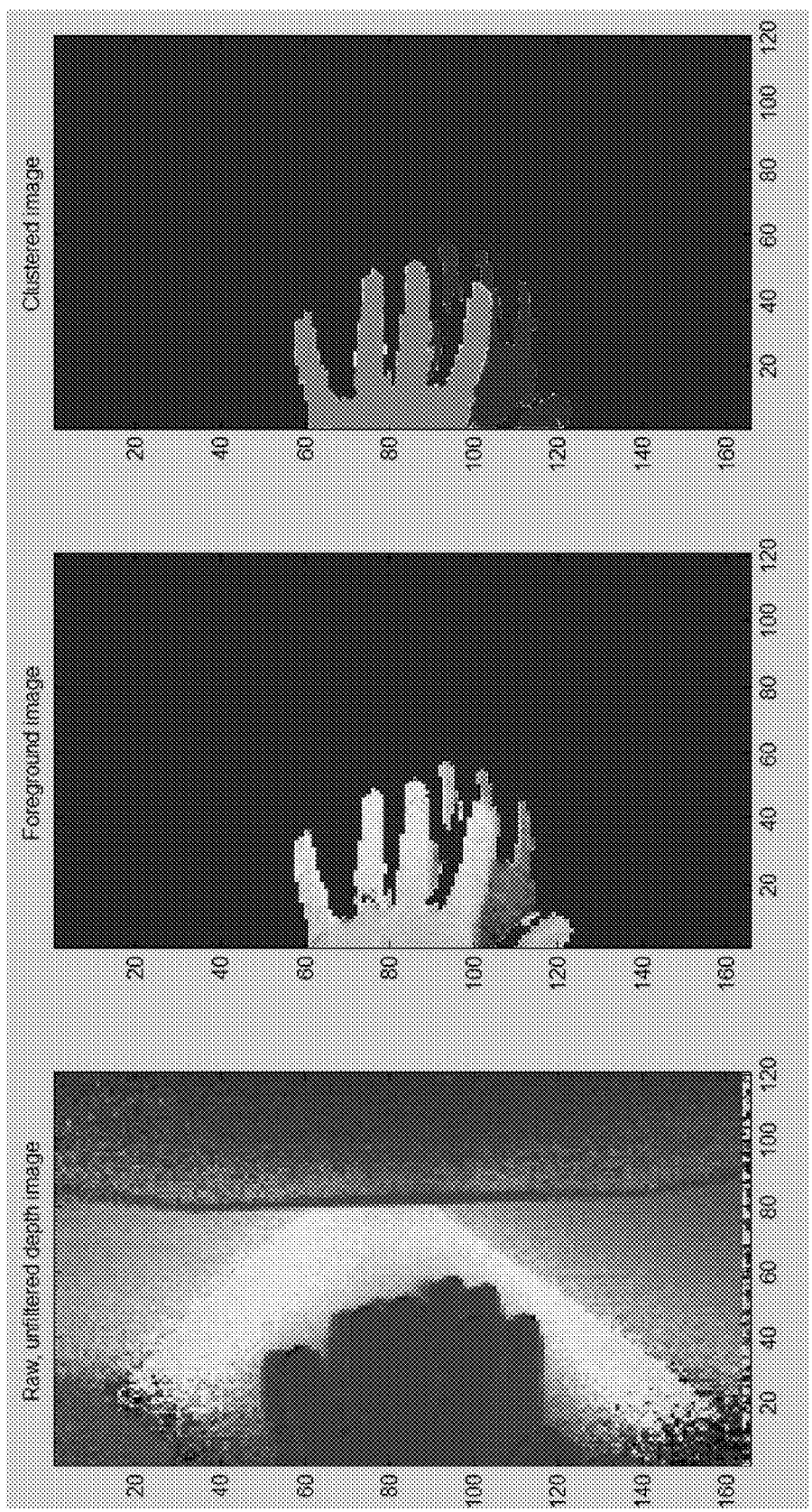
FIG. 5 illustrates exemplary images processed according to an imaging methodology.

The output of the foreground segmentation operation 306 may be a set of ROI masks $G_1, G_2 \ldots G_k$ where k corresponds to the number of regions of interest found in the foreground of an image. For example, as shown in FIG. 5, if a set of user hands is to be imaged, k may be equal to 0, 1 or 2 (if it is assumed that no more than two hands may appear in a scene). Each ROI mask $G_1 \ldots G_k$ may be an M×N matrix of values {−1, 0, 1, 2} where, again, "1" corresponds to pixels from the mask, "−1" are pixels that were removed from the mask, "0" corresponds to pixels not belonging to the mask and "2" marks the pixels that were added to an ROI mask G. In an exemplary case, foreground segmentation operation 306 may be optional where k=1 and ROI mask $G_1$ is made from data validity mask D and foreground mask E using the following prioritized rules:
1) If $D(i,j)=0$ or $E(i,j)=0$, then $G_t(i,j)=0$;
2) If $D(i,j)<0$ or $E(i,j)<0$, then $G_t(i,j)=-1$;
3) If $D(i,j)=1$ and $E(i,j)>0$, then $G_t(i,j)=1$; and
4) If $D(i,j)=2$ and $E(i,j)>0$, then $G_t(i,j)=2$.

Rules 1-4 are illustrated in FIG. 6. Other rules sets may be employed without departing from the scope of these disclosures.

Figure 7:
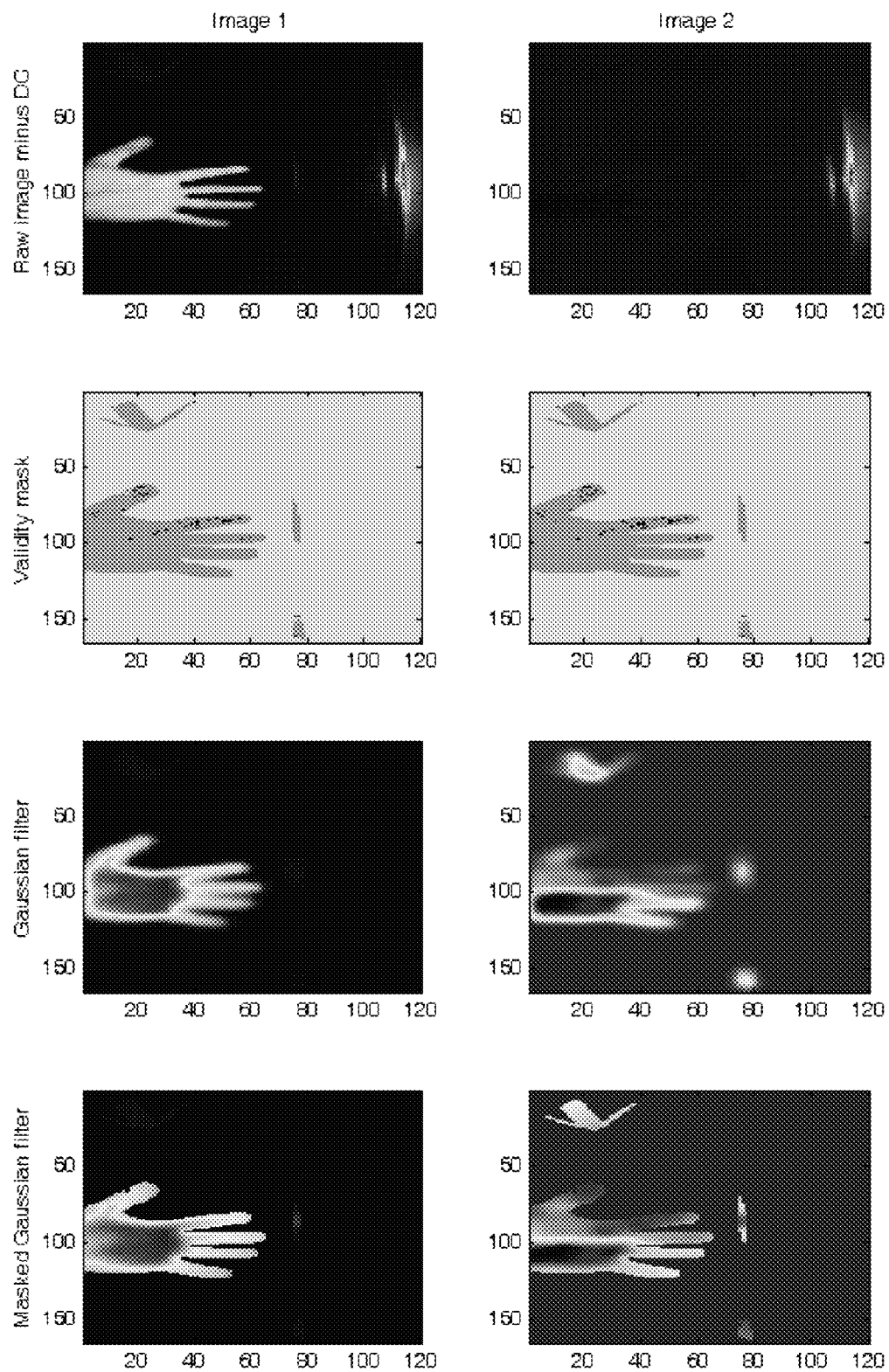
FIG. 7 illustrates exemplary data at an input and output of a raw data filter.
Figure 8:
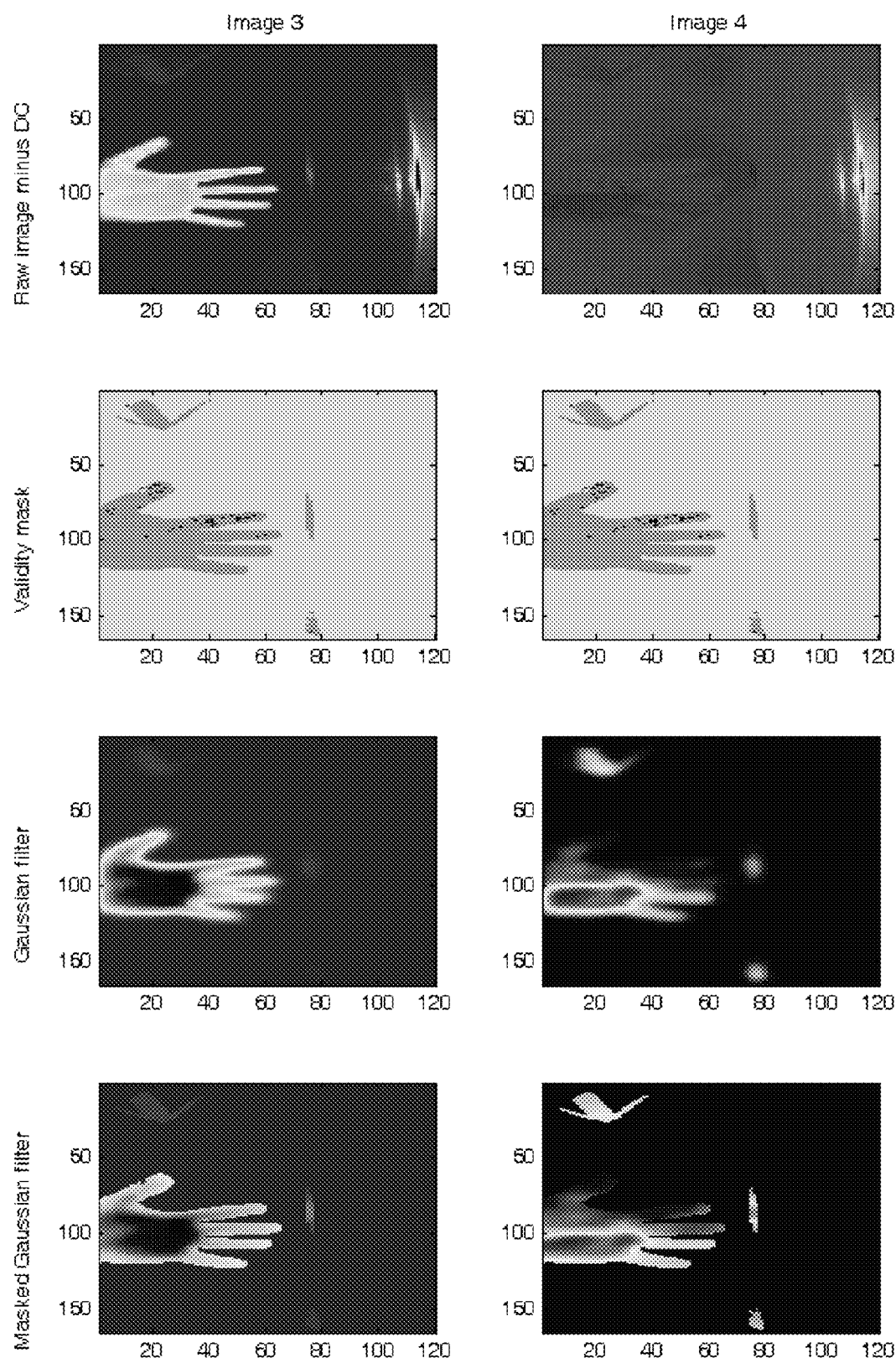
FIG. 8 illustrates exemplary data at an input and output of a raw data filter.

At raw data filter operation 307, the processing device 102 may apply one or more filters to input raw image data $A_1, A_2 \ldots A_n$. For example, a Gaussian or any other noise suppressing algorithm may be applied to ROI masks G and then be combined with the results of the filtering of the raw image data A to generate filtered raw image data H. More specifically, for each ROI mask $G_t$ where $t=1 \ldots k$ a filtered ROI mask $G'_t$ may be generated. The filtered ROI mask $G'_t$ may be an M×N matrix consisting of zeros and ones and have a value of 1 for only those elements of ROI mask $G_t$ that are equal to 1. Further, valid autocorrelation raw image data A' may be defined by as the per-element multiplication of the raw image data A and the filtered ROI mask $G'_t$. Applying the filtered ROI mask $G'_t$ to the raw image data A may avoid distorting the filtering output. It may be the case that the autocorrelation raw image data A' does not take into account the actual number of valid pixels that were used for each filtering step. As such, the autocorrelation raw image data A' may be filtered using a noise suppression linear filter LF. Filtered autocorrelation raw image data A" may be defined as a 2-dimensional convolution of the autocorrelation raw image data A' and the linear filter LF. Further, the ROI mask G' may also be filtered with the linear filter LF to provide a weighted ROI mask G" of each filtering operation. Still further, for each pixel (i,j), filtered raw image data A'''$_t$ may be defined according to: filtered raw image data A'''$_t$(i, j)=0, if ROI mask $G_t(i,j) \leq 0$ (i.e. these pixels are discounted as they are out of the mask); filtered raw image data A'''$_t$(i,j)=autocorrelation raw image data A"(i,j)/ROI mask $G_t"(i,j)$, if ROI mask $G_t(i,j) \geq 0$ (i.e. by dividing by the weight value the results of filtering near mask edges may be equalized). Finally, filtered raw image data H may be generated as: filtered raw image data A''''=filtered raw image data A'''$_1$+filtered raw image data A'''$_2$ . . . filtered raw image data A'''$_k$. For such a combination, it is assumed that ROI masks G are non-intersecting (i.e. for different indexes a and b, where ROI mask $G_a(i,j)>0$ then ROI mask $G_b(i,j) \leq 0$ and where ROI mask $G_a(i,j) \leq 0$ and ROI mask $G_b(i,j)>0$). Absent such a condition, it may be the case that a degree of averaging along ROI mask intersections may be required instead of simple summing. In an alternative embodiment, the raw data filter operation 307 may include more complex techniques such as bilateral filtering. Referring to FIGS. 7 and 8, exemplary data at the input and output of the raw data filter operation 307 are illustrated.

At post-processing operation 308, the processing device 102 may perform post-processing on the various depth distance estimations. For example, the amplitude image a of unfiltered image B determined from image calculation operation 302, the filtered depth distance image d of the filtered image C determined from the image calculation operation 303 and the background estimation F determined from the background detection operation 305 may be obtained. A combined filtered image I may be obtained by combining the amplitude image a of unfiltered image B, the filtered depth distance image d of the filtered image C for any pixel that belongs to ROI masks $G_1, G_2 \ldots G_k$, and, for all other pixels, the background estimation F. If needed, additional filtering may be applied to the combined filtered image I. For example, bilateral filtering based on depth distance image d and amplitude image a may be used. Still further, if needed, a coordinate transform (taking into account camera calibration information and known optical distortions) may be applied to convert depth distance image d to a point cloud consisting of points $(x_i, y_i, z_i)$ represented by 3D coordinates in a Cartesian system.

Figure 9:
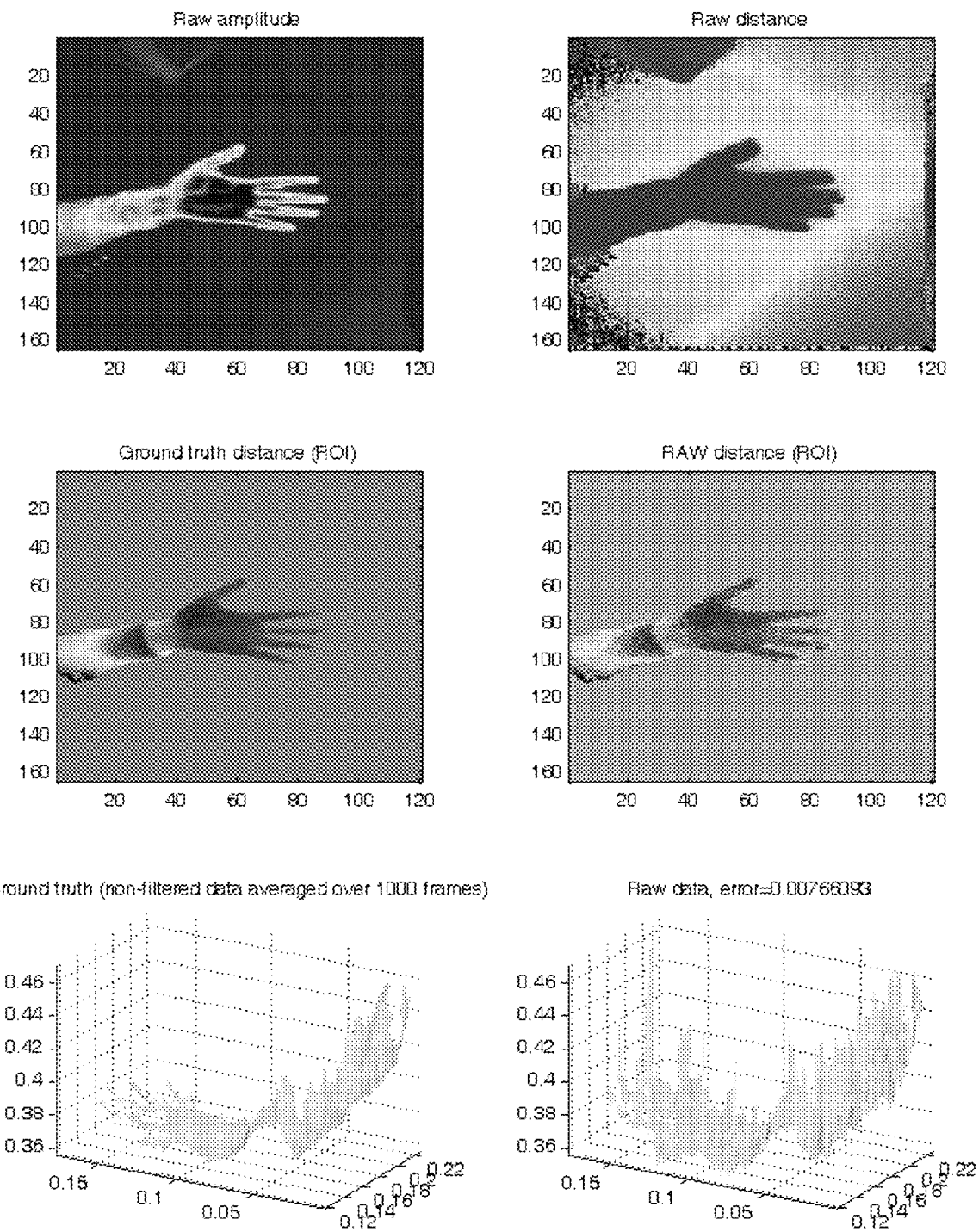
FIG. 9 illustrates exemplary results of an imaging methodology.
Figure 10:
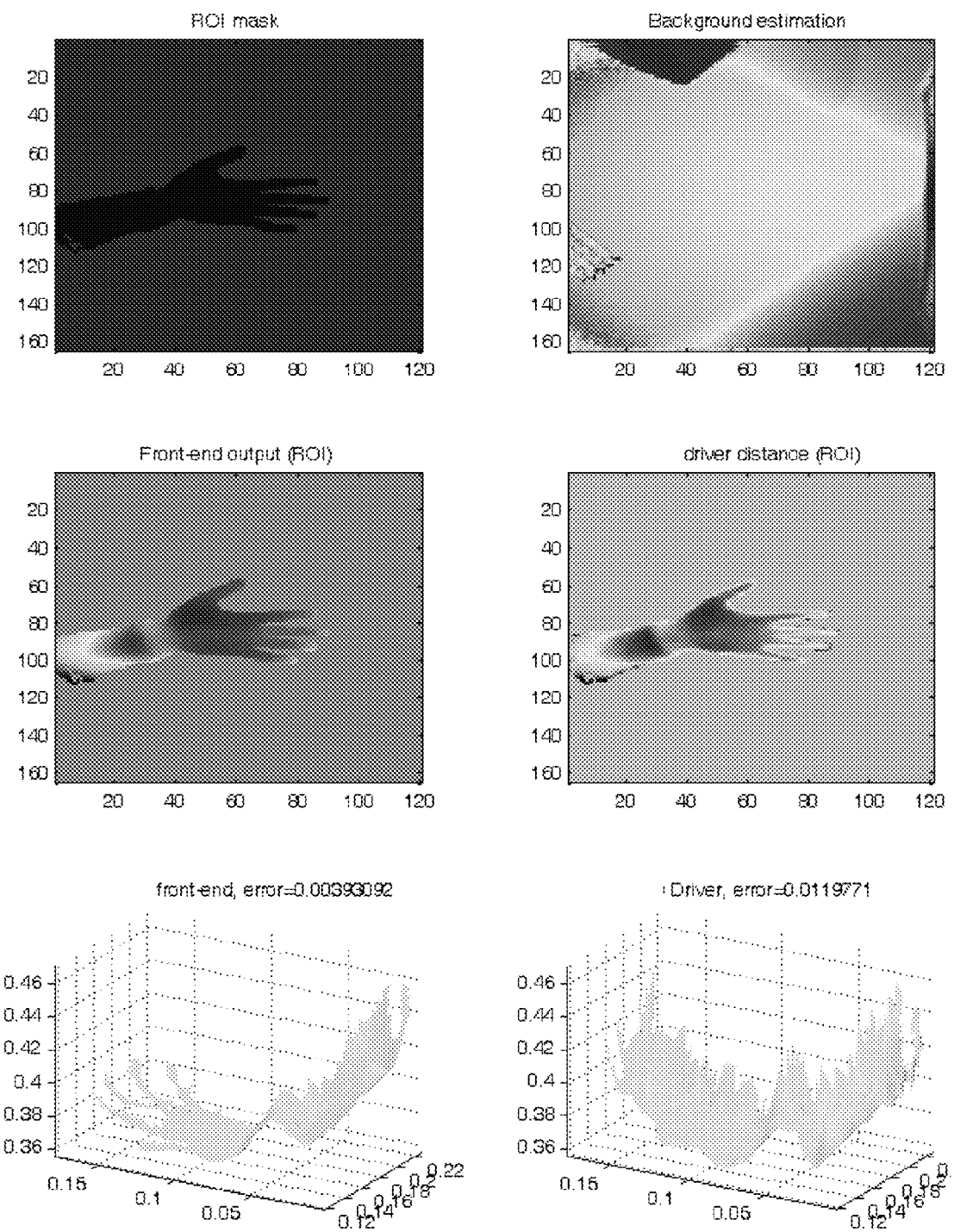
FIG. 10 illustrates exemplary results of an imaging methodology.

Referring to FIGS. 9 and 10, exemplary results of the above methodologies are presented. In one example, the disclosed methodology was implemented in Matlab® and tested for raw autocorrelation images A(1), A(2), . . . A(4) from a conventional ToF camera with n=4. An image of a non-moving hand was acquired from the device for 1000 frames. An average value of non-filtered raw depth estimation was used as "ground truth" information. The output depth surface after applying the proposed front end architecture was compared with raw depth data as well as the result of proprietary depth post-processing algorithm from the camera driver.

It is believed that the present disclosures and many of their attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

The foregoing detailed description may include set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but may be not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art has progressed to the point where there may be little distinction left between hardware, software, and/or firmware implementations of aspects of systems; the use of hardware, software, and/or firmware may be generally (but not always, in that in certain contexts the choice between hardware and software may become significant) a design choice representing cost vs. efficiency tradeoffs. Those having skill in the art will appreciate that there may be various vehicles by which processes and/or systems and/or other technologies described herein may be effected (e.g., hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; alternatively, if flexibility may be paramount, the implementer may opt for a mainly software implementation; or, yet again alternatively, the implementer may opt for some combination of hardware, software, and/or firmware. Hence, there may be several possible vehicles by which the processes and/or devices and/or other technologies described herein may be effected, none of which may be inherently superior to the other in that any vehicle to be utilized may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and or firmware.

What is claimed is:

1. A method for image processing comprising:
   receiving raw image data from at least one imaging device;
   computing at least one image depth distance from the raw image data;
   computing one or more image validity flags from the raw image data;
   generating at least one data validity mask from the one or more image validity flags;
   determining a background imagery estimation from the at least one image depth distance;
   generating at least one foreground mask from the background imagery estimation and the at least one image depth distance;
   generating at least one region-of-interest mask from the at least one data validity mask and the at least one foreground mask using prioritized rules that indicate conditions for assigning values to elements of the at least one region-of-interest mask based on corresponding values of elements of the at least one data validity mask and corresponding values of elements of the at least one foreground mask; and
   generating filtered raw image data from the raw image data and the at least one region of interest mask.

2. The method of claim 1, wherein the at least one imaging device includes:
   at least one time-of-flight camera.

3. The method of claim 1, wherein computing one or more image validity flags from the raw image data includes:
   comparing at least one pixel attribute to at least one threshold value.

4. The method of claim 1, wherein generating at least one data validity mask from the one or more image validity flags includes:
   correlating at least one image validity flag to at least one element of the data validity mask.

5. The method of claim 4, wherein generating at least one data validity mask from the one or more image validity flags further includes:
   removing one or more connected sub-regions of the at least one data validity mask.

6. The method of claim 4, wherein generating at least one data validity mask from the one or more image validity flags further includes:
   filling one or more connected inverted sub-regions of the at least one data validity mask.

7. The method of claim 1, wherein generating at least one region-of-interest mask from the data validity mask and the at least one foreground mask includes:
   segmenting one or more pixels in an image into one or more pixel clusters.

8. The method of claim 7, wherein segmenting one or more pixels in an image into one or more pixel clusters includes:
   segmenting one or more pixels in an image into one or more pixel clusters according to a k-medoids algorithm.

9. The method of claim 1, further comprising:
   computing at least one image amplitude from the raw image data;
   computing at least one filtered image depth distance;
   generating a filtered image from the at least one image amplitude, the at least one filtered image depth distance, the background imagery estimation and the at least one region-of-interest mask.

10. A system for image processing comprising:
    a memory including computer readable instructions; and
    at least one processing device to execute the computer readable instructions to,
    receive raw image data from at least one imaging device;
    compute at least one image depth distance from the raw image data;
    compute one or more image validity flags from the raw image data;
    generate at least one data validity mask from the one or more image validity flags;
    determine a background imagery estimation from the at least one image depth distance;
    generate at least one foreground mask from the background imagery estimation and the at least one image depth distance;

generate at least one region-of-interest mask from the at least one data validity mask and the at least one foreground mask using prioritized rules that indicate conditions for assigning values to elements of the at least one region-of-interest mask based on corresponding values of elements of the at least one data validity mask and corresponding values of elements of the at least one foreground mask; and generate filtered raw image data from the raw image data and the at least one region of interest mask.

11. The system of claim 10, wherein the at least one imaging device includes:
at least one time-of-flight camera.

12. The system of claim 10, wherein the at least one processing device computes the one or more image validity flags from the raw image data by comparing at least one pixel attribute to at least one threshold value.

13. The system of claim 10, wherein the at least one processing device generates the at least one data validity mask from the one or more image validity flags by correlating at least one image validity flag to at least one element of the at least one data validity mask.

14. The system of claim 13, wherein the at least one processing device generates the at least one data validity mask from the one or more image validity flags by removing one or more connected sub-regions of the at least one data validity mask.

15. The system of claim 13, wherein at least one processing device generates the at least one data validity mask from the one or more image validity flags by filling one or more connected inverted sub-regions of the at least one data validity mask.

16. The system of claim 10, wherein the at least one processing device generates the at least one region-of-interest mask from the data validity mask and the at least one foreground mask by segmenting one or more pixels in an image into one or more pixel clusters.

17. The system of claim 16, wherein the at least one processing device segments the one or more pixels in an image into one or more pixel clusters according to a k-medoids algorithm.

18. The system of claim 10, wherein the at least one processing device executes the computer readable instructions to:
compute at least one image amplitude from the raw image data;
compute at least one filtered image depth distance;
generate a filtered image from the at least one image amplitude, the at least one filtered image depth distance, the background imagery estimation and the at least one region-of-interest mask.

19. A non-transitory computer readable medium including one or more processing device-executable instructions for:

receiving raw image data from at least one imaging device;
computing at least one image depth distance from the raw image data;
computing one or more image validity flags from the raw image data;
generating at least one data validity mask from the one or more image validity flags;
determining a background imagery estimation from the at least one image depth distance;
generating at least one foreground mask from the background imagery estimation and the at least one image depth distance;
generating at least one region-of-interest mask from the at least one data validity mask and the at least one foreground mask using prioritized rules that indicate conditions for assigning values to elements of the at least one region-of-interest mask based on corresponding values of elements of the at least one data validity mask and corresponding values of elements of the at least one foreground mask; and
generating filtered raw image data from the raw image data and the at least one region of interest mask.

20. A system for image processing comprising:
an imaging device configured for generating raw image data;
a memory including computer readable instructions; and
a processing device to execute the computer readable instructions to:
receive the raw image data from at least one imaging device;
compute at least one image depth distance from the raw image data;
compute one or more image validity flags from the raw image data;
generate at least one data validity mask from the one or more image validity flags;
determine a background imagery estimation from the at least one image depth distance;
generate at least one foreground mask from the background imagery estimation and the at least one image depth distance;
generate at least one region-of-interest mask from the at least one data validity mask and the at least one foreground mask using prioritized rules that indicate conditions for assigning values to elements of the at least one region-of-interest mask based on corresponding values of elements of the at least one data validity mask and corresponding values of elements of the at least one foreground mask; and
generate filtered raw image data from the raw image data and the at least one region of interest mask.

* * * * *